A. A. ST. CLAIR.
AUTOMATIC SPEED VARYING TRANSMISSION MECHANISM.
APPLICATION FILED MAR. 8, 1915.
1,171,472.
Patented Feb. 15, 1916.
2 SHEETS—SHEET 1.
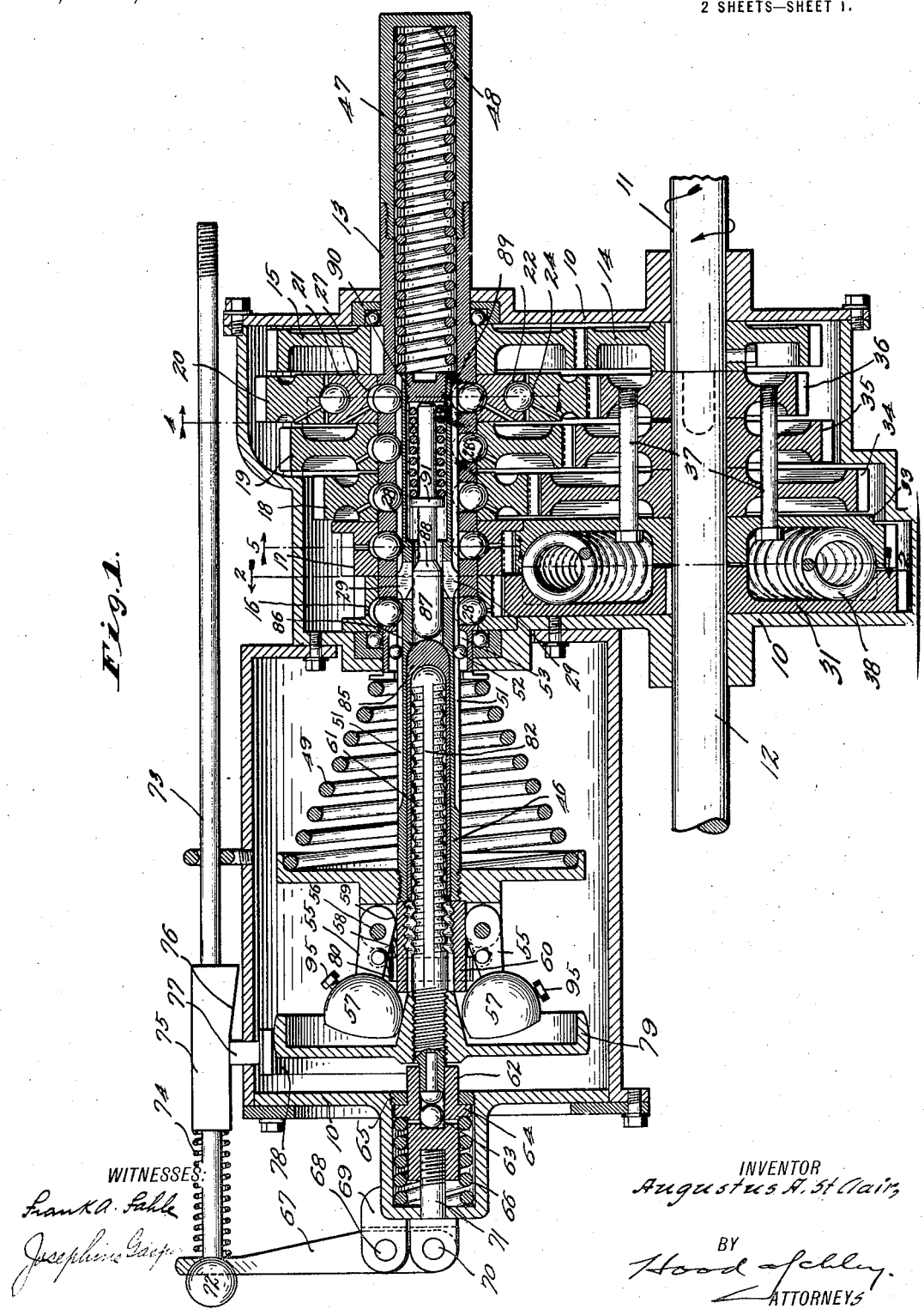
WITNESSES:
Frank A. Fable
Josephine Gasp
INVENTOR
Augustus A. St. Clair
BY
Hood & Schley
ATTORNEYS

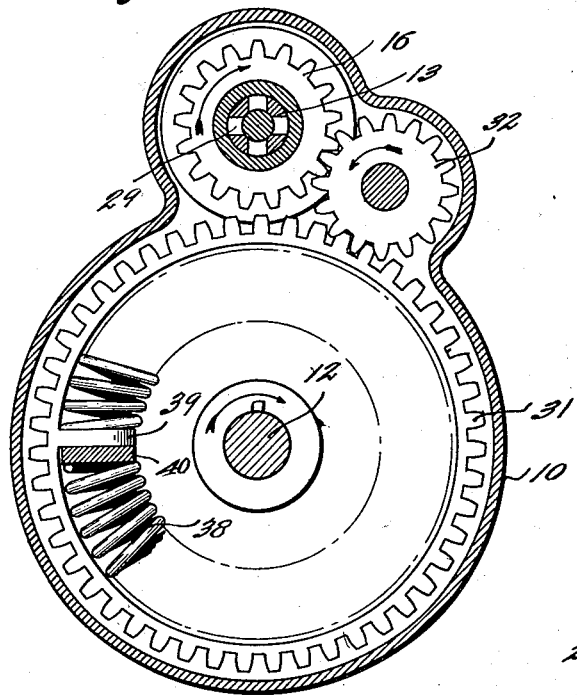
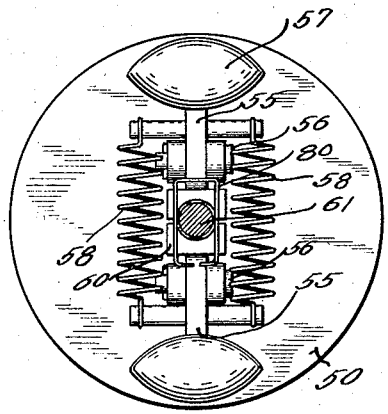
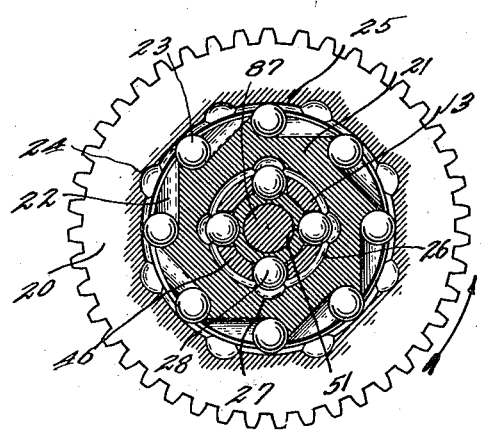
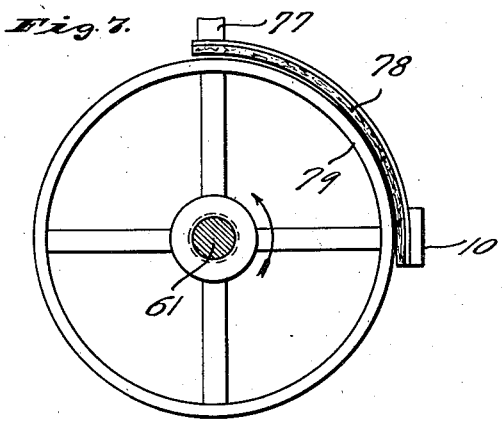
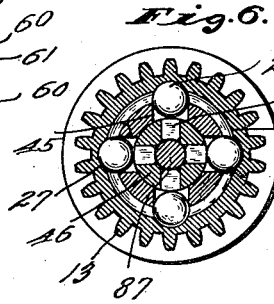
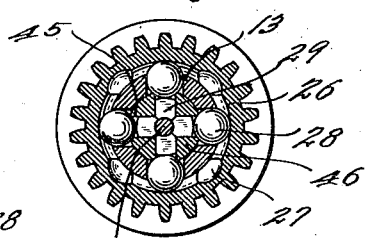

UNITED STATES PATENT OFFICE.

AUGUSTUS A. ST. CLAIR, OF INDIANAPOLIS, INDIANA.

AUTOMATIC SPEED-VARYING TRANSMISSION MECHANISM.

1,171,472.   Specification of Letters Patent.   Patented Feb. 15, 1916.

Application filed March 8, 1915. Serial No. 12,739.

*To all whom it may concern:*

Be it known that I, AUGUSTUS A. ST. CLAIR, a citizen of the United States, residing at Indianapolis, in the county of Marion and State of Indiana, have invented a new and useful Automatic Speed-Varying Transmission Mechanism, of which the following is a specification.

My invention relates to change-speed gearing, particularly for the transmission gearing in automobiles.

It is the object of my invention to provide a change-speed gearing which permits the use of a separate clutch to be dispensed with, is easily controlled to vary the speed, automatically disconnects the parts when the speed is below a predetermined minimum (as when the automobile engine is running too slowly), and is fool-proof.

The accompanying drawings illustrate my invention.

Figure 1 is a central longitudinal section through a change-speed gearing embodying my invention; Fig. 2 is a section on the line 2—2 of Fig. 1; Fig. 3 is an end view of the centrifugal device, with the weights outward, the central screw being in section; Fig. 4 is a section on the line 4 of Fig. 1; Fig. 5 is a section on the line 5 of Fig. 1, with the clutch balls in unclutching position; Fig. 6 is also a section on the line 5 of Fig. 1, with the clutch balls in clutching position; Fig. 7 is an end view of the brake and brake disk used for producing an increase of speed, with the central screw in section; and Fig. 8 is an enlarged cross section through the feed screw, showing the coöperating half nuts and clamping spring in elevation.

The device is conveniently mounted in a casing 10, which is made in any suitable number of parts and is provided with suitable bearings for a shaft 11 which is connected to the source of power, such as the automobile engine, for a shaft 12 which leads to the device to be driven, such as the rear wheels of the automobile, the shafts 11 and 12 being in alinement and one conveniently having a bearing in the end of the other, and for a tubular countershaft 13. Fixed on the shafts 11 and 13 respectively are two intermeshing gears 14 and 15, which furnish a permanent driving connection between these two shafts so that when one rotates the other rotates also.

Loosely mounted on the tubular countershaft 13 are a plurality of gears 16, 17, 18, 19, and 20, the gears 16, 17, 18, and 19 conveniently being integral from their inner to their outer surfaces, while the gear 20 has a separable central member or hub 21 which on its outer surface is provided with a number of inclined ball holes 22 in which are mounted balls 23, which take the position shown in Fig. 4 when the outer part 20 is rotating in the direction of the arrow with relation to its hub 21 but are forced outward by the inclined bottoms of the ball holes 22 into pockets 24 on the inner surface of such outer part 20 when the hub 21 tends to rotate in the direction of the arrow (in Fig. 4) relatively to such outer part, in this latter case locking the hub and outer part together so that they rotate as a unit. The inner surface of the part 20 conveniently has a runway 25 for the balls 23 between the pockets 24, thus preventing relative axial movement between the part 20 and its hub 21 whether such part 20 and hub 21 are locked together for rotary movement or not. The shaft 11 is driven by the engine in the direction which produces a movement of the tubular countershaft 13 in the direction shown by the arrow in Fig. 4. The inner surface of each gear 16, 17, 18, and 19 and of the hub 21 is provided with a runway 26 which at a number of points has deeper pockets 27 for a series of balls 28 arranged in apertures in the tubular countershaft 13, there being a set of these balls 28 for each of said gears and said hub. The balls normally project inward beyond the inner surface of the tubular countershaft 13, as shown by the upper ones of these balls in Fig. 1, so as to allow the coöperating gear or hub to rotate freely on such tubular countershaft; but any set of balls 28 may be pushed outward by longitudinally sliding wedging members 29, slidably mounted within the tubular countershaft 13, to lock the gear or hub coöperating with that set of balls to such tubular countershaft. The operating mechanism for the wedging members 29 will be set forth more fully hereinafter.

Fixed on the shaft 12 is a gear 31, which is connected through an idler gear 32 to the gear 16, so that when the gear 16 is locked to the tubular shaft 13 by its balls 28 the shaft 12 is driven through such gear 16, idler 32, and the gear 31 in the opposite direction from the driving shaft 11. This is for producing backward movement of the automobile, and the ratio of the gears 16 and 31 is usually such that this backward movement is comparatively slow. Loosely mounted on the shaft 12 are a series of gears 33, 34, 35, and 36, which are all connected together by bolts 37. These last-named four gears are of different size, decreasing in diameter in the order named, and mesh respectively with the gears 17, 18, 19, and 20, which are also of different size and increase in diameter in the order named. Between the gears 31 and 33 is formed a pocket in which is located a circular helical spring 38, the two ends of which bear respectively against flanges 39 and 40 which project into such pocket from the gears 31 and 33 respectively. The flanges 39 and 40 are so located relatively to each other and to the spring 38 that when the gears 33, 34, 35, and 36 are driven in the direction of the arrow in Fig. 1, or in the same direction as the shaft 11, they transmit power to the gear 31 through the spring 38, which acts as a cushion for taking any shocks incident to the changing of the speed. The driving of the gears 33, 34, 35, and 36 in this direction is accomplished by forcing outward by the wedging members 29 the set of balls on the inside of the gears 17, 18, 19 or 20 respectively, producing different speed relationships between the shafts 11 and 12 according to which of these gears is thus locked to the tubular countershaft 13.

The wedging members 29 are mounted in radial apertures 45 in a tube 46 which is slidably mounted within the tubular shaft 13 and projects to the left (in Fig. 1) beyond the end of such tubular shaft. A compression spring 47 located in the projecting right hand end of the tubular shaft 13 (Fig. 1) acts between the closed end 48 of such tubular shaft and the end of the tube 46, and another compression spring 49 acts between the left hand end of the tubular shaft 13 and a flanged disk 50 fixed on the tube 46 beyond such left hand end of the tubular shaft 13, the two springs 47 and 49 both tending to push the tube 46 axially toward the left (Fig. 1). The tube 46 is provided with exterior longitudinal grooves or runways 51, for receiving the balls 28 when they are in their innermost position and for also receiving balls 52 located in pockets 53 in the left hand end of the tubular shaft 13. By means of the engagement of these balls with the runways 51, the tube 46 is compelled to rotate with the tubular shaft 13, while being longitudinally slidable therein. The flanged disk 50 is provided with a pair of levers 55 pivoted on pins 56 and provided with weights 57 at their longer ends, and these two levers 55 are connected by a pair of tension springs 58 which tend to draw the weights 57 together. The pins 56 are transverse of the axis of the tube 46, and the weights 57 tend to fly outward by centrifugal force against the action of the springs 58, the weights being shown in their innermost position in Fig. 1 and in their outermost position in Fig. 3. The short ends of the levers 55 are provided with cam surfaces 59, which act against half nuts 60 to force such half nuts inward upon the threads of a screw 61 which projects axially into the tube 46 from the left hand end thereof (Fig. 1). The outer end of the screw 61 is mounted in a bearing sleeve 62, and conveniently bears against a ball 63 within such bearing sleeve for reducing friction to a minimum. The bearing sleeve 62 has a flange 64 for bearing against an inwardly projecting flange 65 on the frame 10 on one side and for receiving the pressure of a compression spring 66 on the other side, the spring 66 acting between the flange 64 and the end of a pocket in the frame 10 to push the bearing sleeve 62 to the right so that the flanges 64 and 65 engage each other. However, the bearing sleeve 62 can be drawn to the left, against the action of the spring 66, by a lever 67 mounted on the pivot pin 68 on a lug 69 from the frame 10 and connected by a pivot pin 70 to a headed screw 71 fixed to the bearing screw 62 and projecting outward to the end of the frame 10. The longer end of the lever 67 has a socket for receiving a ball 72 on the end of an operating rod 73, whereby the pulling of such operating rod to the right (Fig. 1) draws the bearing sleeve 62 to the left. A compression spring 74 between the lever 67 and an operating cam 75 on the operating rod 73 permits such operating rod to be moved to the left (Fig. 1) without affecting the bearing sleeve 62, and the spring 74 tends to return such operating rod 73 to the normal position in which it is shown. The cam 75 has a cam surface 76 which operates on a projection 77 from one end of a brake band 78 the other end of which is fixed to the casing 10, and the brake band normally clears, but may be moved into engagement with, a brake wheel 79 fixed on the left hand end of the screw 61. This screw 61 normally rotates with the tube 46, both by reason of the friction between them and by reason of a U-shaped spring 80 which fits over the laterally narrowed portions 81 at the left hand ends of the half nuts 60 and bears against the screw 61, the surface of which is provided with one or more flattened surfaces 82 to receive the pressure of the spring 80 and thus resiliently clamp together the half nuts 60 and the screw 61 so as to create a tendency for them to rotate together. However, when the brake 78 is set, the rotation of the screw 61 is retarded and the spring 80 yields to permit relative rotation between the half nuts 60 and the screw 61. If at this time the half nuts are clamped upon the screw by the cam surfaces 59 of the levers 55, this relative rotation between the screw and the half nuts causes the tube 46 to be forced to the left against the action of the springs 47 and 49. The screw 61 does not fit tightly within the tube 46, thus leaving an annular space for a thin metal tube 85, the right hand end of which tube 85 is closed and has an exterior bearing against a shoulder 86 on the inside of the tube 46 and an interior bearing against the inner end of the screw 61. The outer surface of the closed end of the thin tube 85 bears against a plunger 87 which is also slidably mounted within such tube 46 and acts against the inner surfaces of the wedging member 29. The plunger 87 has portions of different size connected by a cam surface 88, and normally the wedging members 26 rest against the larger portion of this plunger and are held outward thereby so as to force outward any set of balls 29 with which they may be in engagement, but the smaller portion of the plunger 87 is sufficiently small so that when it engages the wedging members 29 the latter may recede inwardly so as to clear the balls 28 even though the latter are in their innermost position. The tube 85 normally holds the plunger 87 to the normal position, or to the right, as shown, within the tube 46, being sufficiently long so that its left hand end just bears against the half nuts 60 when the latter are clamped upon the shaft 61 by the cam surface 59; but when such half nuts 60 move outward on account of the drawing inward of the weights 57 the left hand end of the tube 85 can slip between the inner surface of the half nuts 60 and the outer surface of the screw 61 to allow the plunger 87 to be pushed to the left by a spring 89 mounted within the right hand end of the tube 46 and acting between a closing plug 90 in such end and a collar 91 on the plunger 87, thus bringing the smaller part of such plunger 87 beneath the wedging members 29.

When the vehicle is at rest the parts are in the position shown in Fig. 1, the spring 66 being sufficiently strong so that it will not be overcome by the combined efforts of the springs 47 and 49 and will thus hold the wedging members 29 in an axial midway position between the balls 28 of the gears 16 and 17, as shown. In this position, none of the gears 16, 17, 18, 19, and 20 are connected to the tubular shaft 13. The engine connected to the shaft 11 may now be started, and will drive the tubular shaft 13 through the gears 14 and 15, such tubular shaft 13 rotating in the direction of the arrow in Fig. 4. The tube 46 rotates with the tubular shaft 13, for reasons already given, and unless the brake 78 is set the screw 61 likewise rotates with the tubular shaft 13 and the tube 46, by reason of the action of the spring 80 on the flattened places 82 on such screw 61. As the shaft 13 gains in speed, the weights 57 are gradually thrown outward until the levers 55 stand nearly at right angles with such tubular shaft, screws 95 being provided for adjustably limiting the outward throw of such weights by engaging with the flanged disk 50. This outward throw of the weights 57 is limited so that the springs 58 are not quite brought to dead center in their action on the levers 55, thus leaving a small leverage by which such springs tend to return the weights 57 to the normal position shown in Fig. 1. As the weights 57 are thrown outward, the cam surfaces 59 force the half nuts 60 inward to clamp them on the screw 61, but by reason of the fact that such screw 61 is rotating at the same speed as the tube 46 this engagement produces no immediate result. If it is now desired to move the vehicle, the operating rod 73 is moved in one direction or the other according to whether backward or forward movement is desired. If backward movement is desired the operating rod 73 is pulled to the right (Fig. 1) thus compressing the spring 66 and allowing the springs 47 and 49 to force the tube 46 to the left to bring the wedging members 29 under the balls 28 of the gear 16 and thereby lock such gear to the tubular shaft 13, whereupon motion is transmitted from such tubular shaft through the gear 16, idler 32, and gear 31 to the shaft 12 and thereby to the driving wheels of the vehicle. When sufficient backward movement has been obtained the operating rod 73 is released by the operator, whereupon it is returned to its normal position by the spring 66, which by its action on the bearing sleeve 62 also forces the tube 46 to the right to bring the parts to the position shown in Fig. 1 and thus unclutch the gear 16 from the tubular shaft 13. If forward movement is desired, the operating rod 73 is moved to the left (Fig. 1) from its normal position shown, thus compressing the spring 74 and causing the cam surface 76 on the cam 75 to act on the finger 77 and set the brake 78 on the brake wheel 79. This causes the screw 61 to be retarded in its rotation, the spring 80 yielding to permit this, and this retardation produces a relative rotation between the tube 46 and the screw 61. If the engine speed is sufficiently great so that the weights 57 are outward to lock the half nuts 60 to the screw 61, this relative rotation causes the half nuts 60 to travel to the right along the screw 61, and thereby to force the tube 46, wedging members 29, tube 61, and plunger 87 toward the right as a unit against the action of the springs 47 and 49. The movement of these parts to the right can be stopped at any point by releasing the operating rod 73 so that the spring 74 may return it in normal position. As these parts move to the right as stated, the wedging members 29 come successively into engagement with the different sets of balls 28 for the gears 17, 18, 19, and 20, leaving each set of balls before engagement with the next, and when in engagement with any set of such balls locking the corresponding gear to the tubular shaft 13, and thus connecting such tubular shaft through that gear and the gear meshing with it, and through the cushioning spring 38, to the shaft 12, to produce a forward movement of the shaft 12 and connected parts at the desired speed. When the balls 28 for the gear 20 are thus engaged by the wedging member 29, the highest speed gearing is obtained, and this is the ultimate point to which the applying of the brake 78 can force the axially slidable parts to the right, for when this point is reached the half nuts engage the right hand end of the threads on the screw 61. If at any time the speed of the tubular shaft 13 falls below a predetermined value, the springs 58 pull the weights 57 quickly to their innermost position, because of the increasing leverage of the springs as the closing of the weights 57 continues, and this inward movement of the weights 57 allows the half nuts 60 to separate, and to move out of engagement with the threads of the screw 61. This may take place with the wedging members 29 at any point. As soon as the half nuts 60 separate sufficiently, the spring 89 forces the plunger 87 and the tube 85 to the left within and relatively to the tube 46, so that the tube 85 passes into the annular space between the half nuts 60 and the screw 61 and prevents such nuts from reëngaging such screw and the smaller part of the plunger 87 comes beneath the wedging members 29 so that they may move inward to clear the balls 28. Immediately the springs 47 and 49 force the tube 46 to the left within the tubular shaft 13, but during this movement of such tubular shaft to the left the various sets of balls 28 which are passed by the wedging members 29 are not forced outward to lock their coöperating gears to such tubular shaft, and the half nuts 60 are prevented from engaging the screw 61. However, as this movement continues, the movement of the tube 85 and the plunger 87 to the left is finally stopped by the end of the screw 61, whereupon the continued movement of the tube 46 and the wedging members 29 under the influence of the springs 47 and 49 forces the half nuts 60 beyond the end of the tube 85, so that they may reëngage the screw 61 when the proper speed of the engine is again attained, and forces the wedging members 29 up the inclined portion 88 and on to the larger portion of the plunger 87. The movement of the tube 85 and the plunger 87 to the left is stopped as above described when the wedging members 29 reach the position shown, which is intermediate between the balls 28 of the gears 16 and 17. By this automatic unclutching action the stalling of the engine is prevented.

When it is desired to stop, it is only necessary to slow down the engine and apply the vehicle brakes. The slowing down of the engine causes the weights 57 to move to their inward position, thus disconnecting the half nuts 60 from the screw 61 and allowing the wedging members 29 to return to the position shown and to unclutch any gear which they may have previously clutched to the tubular shaft 13. No additional clutch is necessary in the transmission between the engine and the vehicle wheels.

When it is desired to coast, it is merely necessary to cause the wedging members 29 to be moved to their extreme limit to the right to connect the gear 20 to the tubular shaft 13, and then to slow down the engine below the vehicle speed, whereupon the outer member of the gear 20 may slip on the inner member or hub 21 thereof in the direction of the arrow in Fig. 4, thus permitting coasting. This slowing down of the engine may be sufficient to cause the weights 57 to swing inward and the parts to return to the normal position shown in Fig. 1, or may be insufficient for this, in which latter case the hub 21 remains clutched to the tubular shaft 13. If it is not desired to connect the high speed gear 20 to the tubular shaft 13 before coasting, the engine may be slowed down sufficiently to cause the wedging members to release the balls 28 with which they are in engagement and return to normal position in the manner already described, whereupon the vehicle may run forward without power from the engine. However, the coasting is usually done with the high speed gear connection, that is with the gear 20 connected to the tubular shaft 13, which is also the normal or ordinary condition for driving.

I claim as my invention:

1. In combination, a driving shaft, a driven shaft, a plurality of gearings between such two shafts, said gearings producing different speed relationships between such shafts, each of said gearings including a releasable clutch connection, and a clutch-setting device for setting the clutch in any of said gearings, said clutch-setting device including a device responsive to centrifugal force for causing the release of all the clutches when the speed of the driving shaft falls below a predetermined value.

2. In combination, a driving shaft, a driven shaft, a gearing between such two shafts, said gearing including a releasable clutch connection, and a clutch-setting device for setting the clutch in said gearing, said clutch-setting device including a device responsive to centrifugal force for causing the release of the clutch and the disconnection of the two shafts when the speed of the driving shaft falls below a predetermined value.

3. In combination, a driving shaft, a driven shaft, a plurality of gearings each interconnecting said driving and driven shafts, each of said gearings including a gear loosely mounted on one of said shafts, said shaft carrying said loose gears being hollow, means longitudinally slidable within said hollow shaft for clutching any of said loosely mounted gears to said shaft as said longitudinally slidable means slides in one direction along said hollow shaft and for leaving said loosely mounted gears loose on said shaft as said longitudinally sliding means slides in the other direction along said hollow shaft, controllable means operated by power from one of said shafts for producing a movement of said longitudinally slidable means along said hollow shaft in said first-named direction, and means tending to move said longitudinally slidable means in the opposite direction along said hollow shaft.

4. In combination, a driving shaft, a driven shaft, a plurality of gearings of different gear ratio each interconnecting said driving and driven shafts, each of said gearings including a gear loosely mounted on one of said shafts, said shaft carrying said loose gears being hollow, means longitudinally slidable within said hollow shaft for clutching any of said loosely mounted gears to said shaft, and manually controllable means operated by power from one of said shafts for producing a movement of said longitudinally slidable means along said hollow shaft in the direction to increase the speed of the driven shaft relative to that of the driving shaft.

5. In combination, a driving shaft, a driven shaft, a plurality of gearings each interconnecting said driving and driven shafts, each of said gearings including a gear loosely mounted on one of said shafts, said shaft carrying said loose gears being hollow, means longitudinally slidable within said hollow shaft for clutching any of said loosely mounted gears to said shaft as said longitudinally slidable means slides in one direction along said hollow shaft and for leaving said loosely mounted gears loose on said shaft as said longitudinally sliding means slides in the other direction along said hollow shaft, controllable means operated by power from one of said shafts for producing a movement of said longitudinally slidable means along said hollow shaft in said first-named direction, means tending to move said longitudinally slidable means in the opposite direction along said hollow shaft, and a centrifugal device responsive to the speed of the driving shaft for rendering inoperative said power-operated means for producing longitudinal sliding of said longitudinally slidable means when the speed of the driving shaft falls below a predetermined value.

6. In combination, a driving shaft, a driven shaft, a plurality of gearings each interconnecting said driving and driven shafts, each of said gearings including a gear loosely mounted on one of said shafts, said shaft carrying said loose gears being hollow, means longitudinally slidable within said hollow shaft for clutching any of said loosely mounted gears to said shaft, controllable means operated by power from one of said shafts for producing a movement of said longitudinally slidable means along said hollow shaft, and a centrifugal device responsive to the speed of the driving shaft for rendering inoperative said power-operated means for producing longitudinal sliding of said longitudinally slidable means when the speed of the driving shaft falls below a predetermined value.

7. In combination, a hollow driving shaft, a driven shaft, a plurality of gearings each interconnecting said driving and driven shafts, each of said gearings including a gear loosely mounted on said hollow driving shaft, means longitudinally slidable within said hollow driving shaft for clutching any of said loosely mounted gears to said shaft as said longitudinally slidable means slides in one direction along said hollow shaft and for leaving said loosely mounted gears loose on said shaft as said longitudinally sliding means slides in the other direction along said hollow shaft, controllable means operated by power from said driving shaft for producing a movement of said longitudinally slidable means along said hollow shaft in said first-named direction, and means tending to move said longitudinally slidable means in the opposite direction along said hollow shaft.

8. In combination, a hollow driving shaft, a driven shaft, a plurality of gearings of different gear ratio each interconnecting said driving and driven shafts, each of said gearings including a gear loosely mounted on said hollow driving shaft, means longitudinally slidable within said hollow driving shaft for clutching any of said loosely mounted gears to said shaft, and manually controllable means operated by power from said driving shaft for producing a movement of said longitudinally slidable means along said hollow shaft in the direction to increase the speed of the driven shaft relative to that of the driving shaft.

9. In combination, a hollow driving shaft, a driven shaft, a plurality of gearings each interconnecting said driving and driven shafts, each of said gearings including a gear loosely mounted on said hollow driving shaft, means longitudinally slidable within said hollow driving shaft for clutching any of said loosely mounted gears to said shaft as said longitudinally slidable means slides in one direction along said hollow shaft and for leaving said loosely mounted gears loose on said shaft as said longitudinally sliding means slides in the other direction along said hollow shaft, controllable means operated by power from said driving shaft for producing a movement of said longitudinally slidable means along said hollow shaft in said first-named direction, means tending to move said longitudinally slidable means in the opposite direction along said hollow shaft, and a centrifugal device responsive to the speed of the driving shaft for rendering inoperative said power-operated means for producing longitudinal sliding of said longitudinally slidable means when the speed of the driving shaft falls below a predetermined value.

10. In combination, a hollow driving shaft, a driven shaft, a plurality of gearings each interconnecting said driving and driven shafts, each of said gearings including a gear loosely mounted on said hollow driving shaft, means longitudinally slidable within said hollow driving shaft for clutching any of said loosely mounted gears to said shaft, controllable means operated by power from said driving shaft for producing a movement of said longitudinally slidable means along said hollow shaft, and a centrifugal device responsive to the speed of the driving shaft for rendering inoperative said power-operated means for producing longitudinal sliding of said longitudinally slidable means when the speed of the driving shaft falls below a predetermined value.

11. In combination, a hollow driving shaft, a plurality of gears loosely mounted thereon, a member longitudinally slidable in said hollow driving shaft for clutching any of said gears to said shaft, a screw normally rotatable with said driving shaft, a releasable connection between the threads of said screw and said longitudinally slidable means, said releasable connection being controlled in response to the speed of said driving shaft, and controllable means for retarding at will the rotation of said screw relative to that of said driving shaft for producing a movement of said longitudinally slidable means in one direction along said driving shaft to clutch the different gears thereon to said shaft in succession if the speed of the driving shaft is above a predetermined value.

12. In combination, a hollow driving shaft, a plurality of gears loosely mounted thereon, a member longitudinally slidable in said hollow driving shaft for clutching any of said gears to said shaft, a screw normally rotatable with said driving shaft, a releasable connection between the threads of said screw and said longitudinally slidable means, and controllable means for retarding at will the rotation of said screw relative to that of said driving shaft for producing a movement of said longitudinally slidable means in one direction along said driving shaft to clutch the different gears thereon to said shaft in succession.

13. In combination, a hollow driving shaft, a plurality of gears loosely mounted thereon, a member longitudinally slidable in said hollow driving shaft for clutching any of said gears to said shaft, a screw normally rotatable with said driving shaft, a releasable connection between the threads of said screw and said longitudinally slidable means, said releasable connection being controlled in response to the speed of said driving shaft, controllable means for retarding at will the rotation of said screw relative to that of said driving shaft for producing a movement of said longitudinally slidable means in one direction along said driving shaft to clutch the different gears thereon to said shaft in succession if the speed of the driving shaft is above a predetermined value, and means for forcing said longitudinally slidable means in the opposite direction along said driving shaft when said releasable means is released.

14. In combination, a hollow driving shaft, a plurality of gears loosely mounted thereon, a member longitudinally slidable in said hollow driving shaft for clutching any of said gears to said shaft, a screw normally rotatable with said driving shaft, a releasable connection between the threads of said screw and said longitudinally slidable means, controllable means for retarding at will the rotation of said screw relative to that of said driving shaft for producing a movement of said longitudinally slidable means in one direction along said driving shaft to clutch the different gears thereon to said shaft in succession, and means for forcing said longitudinally slidable means in the opposite direction along said driving shaft when said releasable means is released.

15. In combination, a hollow driving shaft, a plurality of gears loosely mounted thereon, a member longitudinally slidable in said hollow driving shaft for clutching any of said gears to said shaft, a screw normally rotatable with said driving shaft, a releasable connection between the threads of said screw and said longitudinally slidable means, said releasable connection being controlled in response to the speed of said driving shaft, controllable means for retarding at will the rotation of said screw relative to that of said driving shaft for producing a movement of said longitudinally slidable means in one direction along said driving shaft to clutch the different gears thereon to said shaft in succession if the speed of the driving shaft is above a predetermined value, means for forcing said longitudinally slidable means in the opposite direction along said driving shaft when said releasable means is released, and means rendered operative by the release of said releasable means for preventing the setting thereof during the sliding of said longitudinally slidable means in said last-named direction.

16. In combination, a hollow driving shaft, a plurality of gears loosely mounted thereon, a member longitudinally slidable in said hollow driving shaft for clutching any of said gears to said shaft, a screw normally rotatable with said driving shaft, a releasable connection between the threads of said screw and said longitudinally slidable means, controllable means for retarding at will the rotation of said screw relative to that of said driving shaft for producing a movement of said longitudinally slidable means in one direction along said driving shaft to clutch the different gears thereon to said shaft in succession, means for forcing said longitudinally slidable means in the opposite direction along said driving shaft when said releasable means is released, and means rendered operative by the release of said releasable means for preventing the setting thereof during the sliding of said longitudinally slidable means in said last-named direction.

17. In combination, a hollow driving shaft, a plurality of gears loosely mounted thereon, a member longitudinally slidable in said hollow driving shaft for clutching any of said gears to said shaft, a screw normally rotatable with said driving shaft, a releasable connection between the threads of screw and said longitudinally slidable means, said releasable connection being controlled in response to the speed of said driving shaft, controllable means for retarding at will the rotation of said screw relative to that of said driving shaft for producing a movement of said longitudinally slidable means in one direction along said driving shaft to clutch the different gears thereon to said shaft in succession if the speed of the driving shaft is above a predetermined value, means for forcing said longitudinally slidable means in the opposite direction along said driving shaft when said releasable means is released, and means rendered operative by the release of said releasable means for preventing the clutching of said gears to said shaft during the sliding of said longitudinally slidable means in said last-named direction.

18. In combination, a hollow driving shaft, a plurality of gears loosely mounted thereon, a member longitudinally slidable in said hollow driving shaft for clutching any of said gears to said shaft, a screw normally rotatable with said driving shaft, a releasable connection between the threads of said screw and said longitudinally slidable means, controllable means for retarding at will the rotation of said screw relative to that of said driving shaft for producing a movement of said longitudinally slidable means in one direction along said driving shaft to clutch the different gears thereon to said shaft in succession, means for forcing said longitudinally slidable means in the opposite direction along said driving shaft when said releasable means is released, and means rendered operative by the release of said releasable means for preventing the clutching of said gears to said shaft during the sliding of said longitudinally slidable means in said last-named direction.

19. In combination, a hollow driving shaft, a plurality of gears loosely mounted thereon, a member longitudinally slidable in said hollow driving shaft for clutching any of said gears to said shaft, said longitudinally slidable member being hollow, a screw projecting into said hollow longitudinally slidable members, releasable means for connecting said hollow longitudinally slidable member to the threads of said screw, centrifugal means controlled by the speed of the driving shaft for setting and releasing said releasable means, means for causing relative rotation between said longitudinally slidable member and said screw to produce longitudinal sliding of said longitudinally slidable member in said hollow shaft in one direction, and means for forcing said longitudinally slidable member in the opposite direction along said hollow shaft when said releasable means is released.

20. In combination, a hollow driving shaft, a plurality of gears loosely mounted thereon, a member longitudinally slidable in said hollow driving shaft for clutching any of said gears to said shaft, said longitudinally slidable member being hollow, a screw projecting into said hollow longitudinally slidable member, releasable means for connecting said hollow longitudinally slidable member to the threads of said screw, means for causing relative rotation between said longitudinally slidable member and said screw to produce longitudinal sliding of said longitudinally slidable member in said hollow shaft in one direction, and means for forcing said longitudinally slidable member in the opposite direction along said hollow shaft when said releasable means is released.

21. In combination, a hollow driving shaft, a plurality of gears loosely mounted thereon, a member longitudinally slidable in said hollow driving shaft for clutching any of said gears to said shaft, said longitudinally slidable member being hollow, a screw projecting into said hollow longitudinally slidable member, releasable means for connecting said hollow longitudinally slidable member to the threads of said screw, centrifugal means controlled by the speed of the driving shaft for setting and releasing said releasable means, means for causing relative rotation between said longitudinally slidable member and said screw to produce longitudinal sliding of said longitudinally slidable member in said hollow shaft.

22. In combination, a hollow driving shaft, a plurality of gears loosely mounted thereon, a member longitudinally slidable in said hollow driving shaft for clutching any of said gears to said shaft, said longitudinally slidable member being hollow, a screw projecting into said hollow longitudinally slidable member, releasable means for connecting said hollow longitudinally slidable member to the threads of said screw, means for causing relative rotation between said longitudinally slidable member and said screw to produce longitudinal sliding of said longitudinally slidable member in said hollow shaft.

23. In combination, a hollow driving shaft, a plurality of gears loosely mounted thereon, a member longitudinally slidable in said hollow driving shaft for clutching any of said gears to said shaft, said longitudinally slidable member being hollow, a screw projecting into said hollow longitudinally slidable member, releasable means for connecting said hollow longitudinally slidable member to the threads of said screw, means for causing relative rotation between said longitudinally slidable member and said screw to produce longitudinal sliding of said longitudinally slidable member in said hollow shaft in one direction, means for forcing said longitudinally slidable member in the opposite direction along said hollow shaft when said releasable means is released, and means for preventing re-setting of said releasable means during the movement of said longitudinally slidable means in said last-named direction.

24. In combination, a hollow driving shaft, a plurality of gears loosely mounted thereon, a member longitudinally slidable in said hollow driving shaft for clutching any of said gears to said shaft, said longitudinally slidable member being hollow, a screw projecting into said hollow longitudinally slidable member, releasable means for connecting said hollow longitudinally slidable member to the threads of said screw, means for causing relative rotation between said longitudinally slidable member and said screw to produce longitudinal sliding of said longitudinally slidable member in said hollow shaft in one direction, means for forcing said longitudinally slidable member in the opposite direction along said hollow shaft when said releasable means is released, and means for preventing the clutching of said gears to said hollow shaft during the movement of said longitudinally slidable means in said last-named direction.

25. In combination, a hollow driving shaft, a plurality of gears loosely mounted thereon, a member longitudinally slidable in said hollow driving shaft for clutching any of said gears to said shaft, said longitudinally slidable member being hollow, a screw projecting into said hollow longitudinally slidable member, releasable means for connecting said hollow longitudinally slidable member to the threads of said screw, centrifugal means controlled by the speed of the driving shaft for setting and releasing said releasable means, said longitudinally slidable member being rotatable with said hollow shaft and said screw normally rotating with said longitudinally slidable member, and means for retarding the rotation of said screw for producing longitudinal movement of said longitudinally slidable member along said hollow shaft if said releasable means is set.

26. In combination, a hollow driving shaft, a plurality of gears loosely mounted thereon, a member longitudinally slidable in said hollow driving shaft for clutching any of said gears to said shaft, said longitudinally slidable member being hollow, a screw projecting into said hollow longitudinally slidable member, releasable means for connecting said hollow longitudinally slidable member to the threads of said screw, said longitudinally slidable member being rotatable with said hollow shaft and said screw normally rotating with said longitudinally slidable member, and means for retarding the rotation of said screw for producing longitudinal movement of said longitudinally slidable member along said hollow shaft if said releasable means is set.

27. In combination, a hollow driving shaft, a plurality of gears loosely mounted thereon, a member longitudinally slidable in said hollow driving shaft for clutching any of said gears to said shaft, a driven member connected to said driving shaft through one of the aforesaid gears, and a device in said connection for permitting faster movement of said driven member when it is connected to said driving shaft through said connection and said gear than that which is produced by its driving from said driving member.

28. In combination, a hollow driving shaft, a plurality of gears loosely mounted thereon, a member longitudinally slidable within said hollow driving shaft to clutch the different ones of said gears thereto, opposing springs tending to move said longitudinally slidable means to an intermediate position, and means for overcoming either of said springs to produce a movement of said longitudinally slidable means in either direction from said intermediate position to clutch different ones of said gears to said shaft.

29. In combination, a hollow driving shaft, a plurality of gears loosely mounted thereon, a member longitudinally slidable within said hollow driving shaft for clutching the different gears to said shaft, opposing springs tending to maintain said longitudinally slidable means in an intermediate position, manually operated means for overcoming one of said springs to produce a movement of said longitudinally slidable means in one direction from said intermediate position, and power-operated means operated by power from said driving shaft for overcoming the other of said springs to produce a movement of said longitudinally slidable means in the opposite direction from said intermediate position.

30. In combination, a hollow driving shaft, a plurality of gears loosely mounted thereon, a member longitudinally slidable within said hollow driving shaft for clutching the different gears to said shaft, opposing springs tending to maintain said longitudinally slidable means in an intermediate position, manually operated means for overcoming one of said springs to produce a movement of said longitudinally slidable means in one direction from said intermediate position, and power-operated means operated by power from said driving shaft for overcoming the other of said springs to produce a movement of said longitudinally slidable means in the opposite direction from said intermediate position, said power-operated means including a centrifugal device which renders said power-operated means inoperative when the speed of the driving shaft falls below a predetermined value.

31. In combination, a driving shaft, a driven shaft, a plurality of gearings each interconnecting said driving and driven shafts, each of said gearings including a gear loosely mounted on one of said shafts, said shaft carrying said loose gears being hollow, means longitudinally slidable within said hollow shaft for clutching any of said loosely mounted gears to said shaft as said longitudinally slidable means slides in one direction along said hollow shaft and for leaving said loosely mounted gears loose on said shaft as said longitudinally sliding means slides in the other direction along said hollow shaft.

32. In combination, a hollow driving shaft, a driven shaft, a plurality of gearings each interconnecting said driving and driven shafts, each of said gearings including a gear loosely mounted on said hollow driving shaft, means longitudinally slidable within said hollow driving shaft for clutching any of said loosely mounted gears to said shaft as said longitudinally slidable means slides in one direction along said hollow shaft and for leaving said loosely mounted gears loose on said shaft as said longitudinally sliding means slides in the other direction along said hollow shaft.

33. In combination, a driving shaft, a driven shaft, a plurality of gearings of different gear ratio between such two shafts, each of said gearings including a releasable clutch connection, and a clutch-setting device having a normal position in which it sets none of such clutch connections but movable to produce the setting of any of said clutch connections, said clutch-setting device including a device responsive to centrifugal force for causing the return of said clutch-setting device to said normal position when the speed of the driving shaft falls below a predetermined value.

34. In combination, a driving shaft, a driven shaft, a plurality of gearings each interconnecting said driving and driven shafts, each of said gearings including gears loosely mounted on one of said shafts, said shaft carrying said loose gears being hollow, means longitudinally slidable within said hollow shaft for clutching any of said loosely mounted gears to said shaft, said slidable means having a normal position in which it clutches none of said loosely mounted gears to said shaft, and controllable means operated by power from one of said shafts for producing a movement of said longitudinally slidable means along said hollow shaft from said normal position.

35. In combination, a hollow driving shaft, a driven shaft, a plurality of gears each connecting said driving and driven shaft, each of said gears including a gear loosely mounted on said hollow driving shaft, means longitudinally slidable within said hollow driving shaft for clutching any of such loosely mounted gears to said shaft, said slidable means having a normal position in which it clutches none of said loosely mounted gears to said shaft, and controllable means operated by power from said driving shaft for producing a movement of said longitudinally slidable means along said hollow shaft.

In witness whereof, I have hereunto set my hand at Indianapolis, Indiana, this first day of March, A. D. one thousand nine hundred and fifteen.

AUGUSTUS A. ST. CLAIR.

Witnesses:
JOSEPHINE GASPER,
LOUISE BENNETT.